(12) United States Patent
Keller et al.

(10) Patent No.: US 8,639,076 B2
(45) Date of Patent: Jan. 28, 2014

(54) FIBER OPTIC CABLE WITH IMPROVED LOW TEMPERATURE AND COMPRESSION RESISTANCE

(75) Inventors: David Keller, Cary, NC (US); Paul Kroushl, Lancaster, PA (US); Randie Yoder, Garner, NC (US); Dan Rouse, Apex, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/858,153

(22) Filed: Aug. 17, 2010

(65) Prior Publication Data

US 2012/0134634 A1   May 31, 2012

(51) Int. Cl.
*G02B 6/44* (2006.01)
(52) U.S. Cl.
USPC .......................................................... 385/113
(58) Field of Classification Search
USPC .......................................................... 385/113
See application file for complete search history.

(56) References Cited

U.S. PATENT DOCUMENTS

| | | | |
|---|---|---|---|
| 5,011,880 A * | 4/1991 | Cornibert et al. | 524/371 |
| 5,390,273 A | 2/1995 | Rahman et al. | |
| 5,408,562 A | 4/1995 | Yoshizawa et al. | |
| 6,178,278 B1 | 1/2001 | Keller et al. | |
| 7,242,831 B2 * | 7/2007 | Fee | 385/103 |
| 2003/0202757 A1 | 10/2003 | Um et al. | |

FOREIGN PATENT DOCUMENTS

| | | |
|---|---|---|
| EP | 0916980 | 5/1999 |
| EP | 1223448 | 7/2002 |
| EP | 1890175 | 2/2008 |
| EP | 1916554 | 4/2008 |

\* cited by examiner

*Primary Examiner* — Jerry Rahll
(74) *Attorney, Agent, or Firm* — Sofer & Haroun, LLP

(57) ABSTRACT

A fiber optic cable is provided with a plurality of buffer tubes each with one or more optical fibers, a plurality of strength members and a jacket. The fibers within the cable meet maximum attenuation of substantially 0.07 db increase when decreasing from −23° C. to −60° C.

24 Claims, 6 Drawing Sheets

FIBER OPTIC CABLE WITH IMPROVED LOW TEMPERATURE AND COMPRESSION RESISTANCE

BACKGROUND

1. Field of the Invention

This application relates to communication cables. More particularly, this application relates to loose-tube type fiber optic cables.

2. Description of the Related Art

In the area of fiber optic cables, there are many different designs, each of which has some purpose both in fiber count, mechanical properties, environmental resistance properties, fire resistance/smoke, etc. . . . . . Among the various designs, mid count-designs (eg. more than 12—less than 100 fibers) typically contain the fibers in a loose tube style arrangement. "Loose tube" is a commonly understood term designating a fiber cable design that has a jacket, at least one buffer tube inside the jacket with at least one (usually more) UV coated optical fiber(s) loosely contained inside each buffer tube.

More particularly, the "loose" term in "loose tube" refers to the fibers being loose within buffer tube thus allowing the fibers to reside within a relatively free space. Within this free space the fibers have the ability to bend/move (such as into a sinusoidal shape) along the length of the cable, accumulating as the cable (jacket and tubes) contracts over cold temperature extremes. By allowing for this "loose" room with the buffer tubes, the fibers are able to avoid the stresses imparted by the cold temperatures on the tubes and jacket and thus likewise avoid undue attenuation.

FIGS. 1 and 2 show typical prior art loose tube fiber optic cables for forty eight (48) fibers (FIG. 1) and seventy two (72) fibers (FIG. 2). In these figures, a jacket is provided with either four or six buffer tubes each having twelve (12) loose fibers therein. Each of the tubes are arranged around a central strength member, typically a GRP (Glass Reinforced Polymer) to provide various mechanical advantages to the cable including longitudinal strength, and cold temperature contraction resistance, cable resistance, etc. . . . . In these present examples in FIGS. 1 and 2, a few (e.g. three) aramid strength strands are added to the interior of the tube(s) to aid with the process of adding connectors to the fibers at the ends of tubes (i.e. once they are removed from the cable for connectorization).

Although this design is adequate for many purposes it has certain drawbacks particularly with cold temperature resistance for designs having four (4) tubes because the center space is small relative to the cold temperature contraction forces of the tubes and jacket areas. As noted above, a normal design feature for fiber optic cables is a cold temperature resistance rating, meaning that the cable does not overly attenuate at some particular cold temperature. For example, in many designs for mid-count fiber optic cables, there is a maximum allowable attenuation of 0.3 db change under low temperature conditions (typically either 0 C, −20 C or −40 C).

The reason this is important is that the polymers typically used for a jacket and the buffer tubes, such a PE (polyethylene), PVC/FRPVC (polyvinylchloride/flame retardant polyvinylchloride), FEP (Fluorinated Ethylene Polymer), PVDF (Polyvinylidene Fluoride) etc. . . . , shrink a good amount, eg. between 0.2% to 1.5% shrinkage through the transition from room temp (23° C.) to cold temperatures (to −40° C.). Likewise, the UV coated glass fibers, loosely contained in the buffer tubes, also contracts in the cold, but to a much lesser extent, e.g. approximately 0.08%-1%. Moreover, the Aramid in the outer layer actually undergoes a moderate expansion in cold temperatures. The GRP, a composite of glass and plastic, only contracts a slight amount, e.g. approximately 0.04%.

The contraction in cold temperatures of the tubes and jacket to a much greater extent than the fibers in the tubes (and the GRPs), results in the fibers gaining excess length relative to the tubes they are contained within, resulting in the fibers assuming an exacerbated sinusoidal shape after the interior spiral helix space within the loose tube stranding is consumed. Thus, as the temperature continues to go down, the attenuation in the fibers goes up resulting in the cable eventually failing. This situation can actually be further exacerbated in the situation where aramid yarns are in the tubes since that further limits the available free space in the tubes for the fibers to adjust.

OBJECTS AND SUMMARY

The present arrangement overcomes the drawbacks associated with the prior art and provides a loose tube fiber optic cable design for mid-count fiber optic cables that is capable of significantly improved cold temperature resistance, such as maximum attenuation of 0.07 db increase when decreasing from −23° C. to −60° C.

Moreover, the present arrangement has additional advantages regarding other mechanical characteristics including improved crush resistance and moisture resistance.

To this end, a fiber optic cable is provided with a plurality of buffer tubes each with one or more optical fibers, a plurality of strength members and a jacket. The fibers within the cable meet maximum attenuation of substantially 0.07 db increase when decreasing from −23° C. to −60° C.

BRIEF DESCRIPTION OF THE DRAWINGS

The present invention can be best understood through the following description and accompanying drawings, wherein.

DETAILED DESCRIPTION

Figure 3:
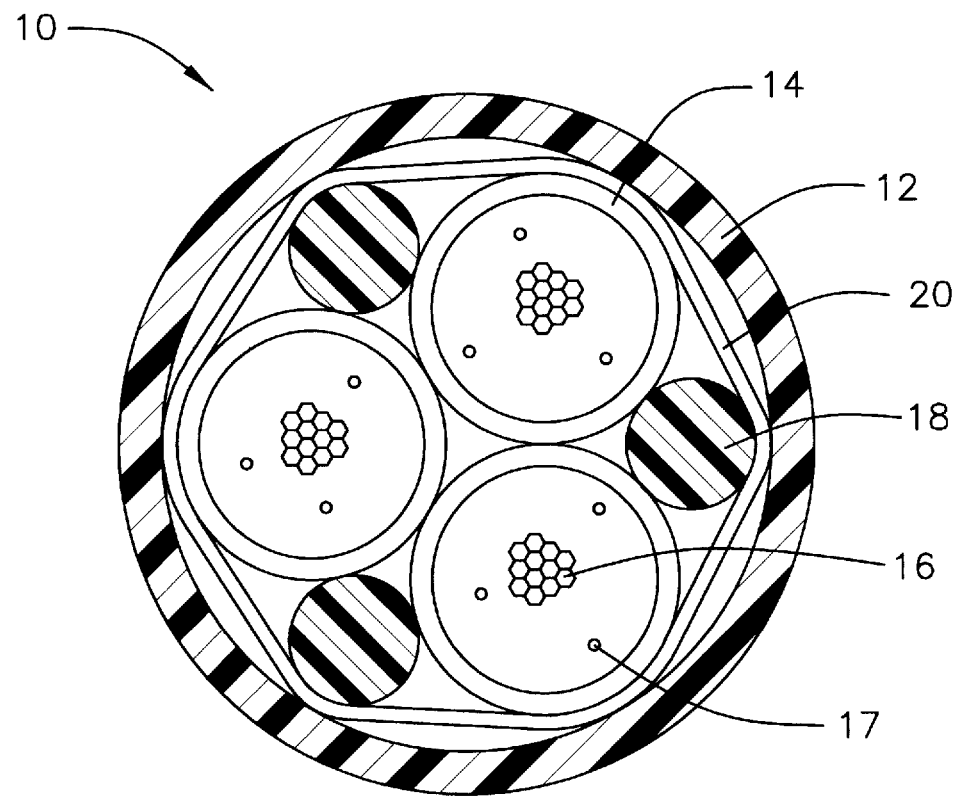
FIG. 3 is a cross section of a loose tube fiber optic cable according to one embodiment.

In one embodiment of the present arrangement shown in FIG. 3, a fiber optic cable 10 is shown for containing thirty six (36) fibers. Cable 10 includes an outer jacket 12 and three (3) buffer tubes 14 therein. Buffer tubes 14 are preferably constructed of FRPVC (Flame Resistant Polyvinylchloride), and jacket 12 is made from either PVDF (Polyvinylidene Fluoride) or FRPVC. It is noted that the invention is not limited in this respect and the features described herein for cable 10 may be used in cable construction using other polymers for jacket 12 and tubes 14 as desired.

Regarding the polymer used for jacket 12, PVDF provides very good smoke and fire resistance properties and also provide good crush resistance properties and cold temperature brittleness resistance. However, PVDF is expensive and does tend to have a higher coefficient of linear expansion/contraction meaning that in cold temperatures the PVDF jacket may shrink significantly (even more so than the FRPVC tubes). As such, rather than using FRPVC for tubes 14, it may also be used for jacket 12 as well. This version (FR) of PVC provides adequate smoke and fire resistance properties for plenum and riser fire ratings for communication cables and even helps with the cold temperature shrinkage issue discussed in this application.

However, because the FR version of PVC requires a low young's modulus of approximately 1800-2800 it does not behave as good crush resistance. For example, typically, to make FRPVC the FR fillers are maximized and the plasticizers, that allow flexibility at low temperatures, are minimized due to their negative or excessive fuel contribution in the riser or plenum test. However the FRPVC still needs a low temperature resistance (notch test) −20° C. to −40° C. to be able to relatively withstand to 0° C. to −20° C. cold temperature impact test and general impacts of low temperature installations. Typically, the modulus of PVC increases and becomes more brittle as the plastic become colder further complicating the cold temperature requirement. Thus, starting with a lower modulus PVC to make FRPVC provides a balance of the fire resistant fillers and minimal plasticizers resulting in the workable compromise. Thus, while having a low modulus PVC aids in passing cold impact, the ability to withstand external crush forces is often reduced to an unacceptable level, which is addressed in more detail below.

As such, the present invention contemplates the use of both PVDF or FRPVC for jacket 12. In one exemplary embodiment discussed herein, jacket 12 is constructed from PVDF. Later, an additional embodiment with a FRPVC is discussed in more detail.

Returning to the components of cable 10, according to the present exemplary arrangement of FIG. 3, each of tubes 14 include twelve (12) fibers 16, such as typically UV coated optical fibers with a size of approximately 250 microns. It is noted that if desired instead of UV coated optical fibers 16, they may be tight buffer type (900 micron) fibers, such as one or two per tube 14. However, for the purposes of illustrating the features of the present arrangement, fibers 16 are described throughout as basic UV coated glass optical fibers 16.

In addition, FIG. 3 shows each tube having three (3) aramid strength members 17 within each tube 14. Aramids 17 are included in a cable 10 design known as ACP (Aramid Connect Plenum) meaning that aramids 17 help with providing connectorization strength. It is understood that the features of the present arrangement may alternatively be presented as an LTP (Loose Tube Plenum) cable 10 without any aramids in tubes 14.

Regarding the assembly of the internal component of cable 10, as shown in FIG. 3, each tube 14 is positioned in the center of jacket 12, with one GRP (Glass Reinforced Polymer) 18 per tube 14, each positioned around the periphery of the internal components of cable 10. GRPs 18 are preferably made of glass, but may also be made from aramid.

As shown in FIG. 3, a binder 20 is shown surrounding tubes 14 and GRPs 18 (Glass Reinforced Polymer). In one exemplary arrangement, binder 20 is preferably 0.25 inches wide approximately comprised a quantity of four (4) 1500 denier polyester water swellable binders assembled into one unit with an added water swellable coating thereon. Binder 20 has a nominal strength of 1.5 lbs per 1% elongation per each of the four strands, thus adding up to 6 lbs per 1% elongation. It is understood that this binder 20 is exemplary only and may be modified as necessary for the design.

According to one embodiment, the assembly of tubes 14, Glass Reinforced Polymers (GRPs) 18 and binder 20 within jacket 12, the three (3) rod (GRP 18) and three (3) tube 14 assembly is accomplished by having the GRPs 18 at a 20%-50% lower pay off tension than tubes 14 and using a 3-4 inch SZ lay length. Binder 20 is then advantageously applied in a helical lay length of 0.8 inches over the SZ stranded GRPs 18 and tubes 14.

According to the above arrangement, a significant improvement is made regarding the ability of cable 10 to withstand environmental cold temperature shrinkage, avoiding excessive attenuation in fibers 16 as described in more detail below.

Generally, the cold temperature contraction between two materials is substantially balanced by the SUM of the AE∂/AE of the two materials where A=area, E=modulus and "∂"=coefficient of contraction. For example, in a simple exemplary case, a buffer tube (material 1) and a GRP (material 2) where the A, E and ∂ are different for each material (1 and 2), the combined elements stranded together render an effective "∂" (of the unit) where:

Sum of respective material AE∂ s or (A1×E1×∂1)+(A2×E2×∂2) is divided by Sum of respective material AE s or (A1×E1)+(A2×E2) to render the effective ∂ or coefficient of expansion or contraction for the assembly. As the modulus of the plastic (material 1 in the example) is decreased, the need for the offsetting modulus of the GRP is decreased to a point. However, in the case of the four buffer tubes around one GRP as in the background FIG. 1, the center GRP is small in area relative to the area of the plastic of tubes 14 and jacket 12 comparatively. Additionally, due to the geometrical layout of the four (4) tubes around one GRP in the prior art FIG. 1, there is minimal available space in the perimeter voids (between the tubes and the inside of the jacket) for placement of substantial/additional GRPs.

Figure 1:
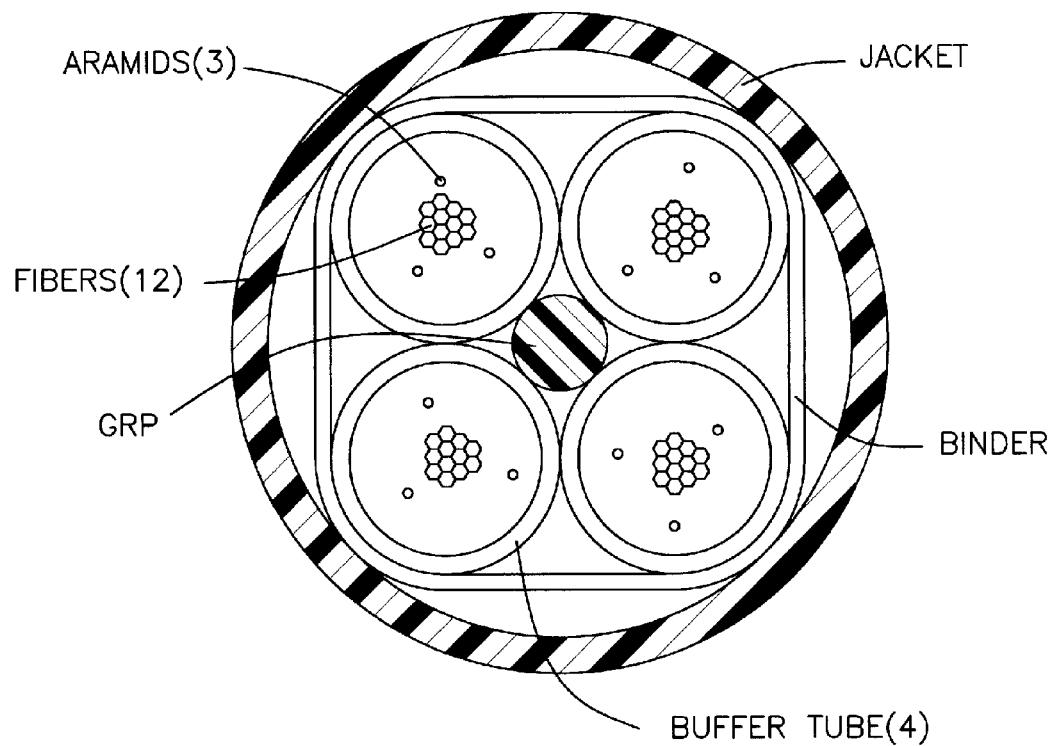
FIGS. 1 and 2 are prior art loose tube fiber optic cables.

As result, the single GRP is not able to fully compensate for the shrinkage in cold temperatures and thus the overall design of the prior art FIG. 1, reaches the edge of the limit for attenuation resistance. In other words, the use of four tubes around on GRP results in an overall combined coefficient of contraction that is only barely sufficient to prevent shrinkage (e.g. at 0° C.) to the point where the fibers in the tubes will bend into exaggerated sinusoidal waves. This situation is even further deteriorated when aramids are added inside the tubes, further reducing the amount of free space in the tubes.

The present arrangement as shown in FIG. 3 does not have this problem. As noted above, the effective coefficient of expansion ∂ of an assembly of cable components is a function of the SUM AE∂(1−i)/SUM AE(1−i) of each material. Thus, according to the present arrangement the area of GRPs 18 is increased relative to the area of tubes 14 and jacket 12, offsetting the area of the plastic. Moreover, the FRPVC used for tubes 14 is filled with additional flame retardant fillers which also act to reduce the contraction of the plastic to some extent. In addition to these two factors, because the GRPs 18 and tubes 14 are arranged on a one-by-one basis in an SZ stranded and bound arrangement, the geometry of this assembly works to couple the lesser contracting GRPs 18 to the tubes 14, again increasing the cold temperature resistance of the assembly.

The above description illustrates that the plastic (jacket and tubes) to GRP ratio of the present arrangement is desirably more tightly controlled to within substantially 9.9 to 12.7 as opposed to the typical prior art which can widely range over 7.5 to 34.7.

Such an arrangement, as shown in FIG. 3 can act to cut the approximate contraction of the assembly of GRPs 18 and tubes 16 in half from 0.22% to 0.11% with additional details to follow.

Figure 2:
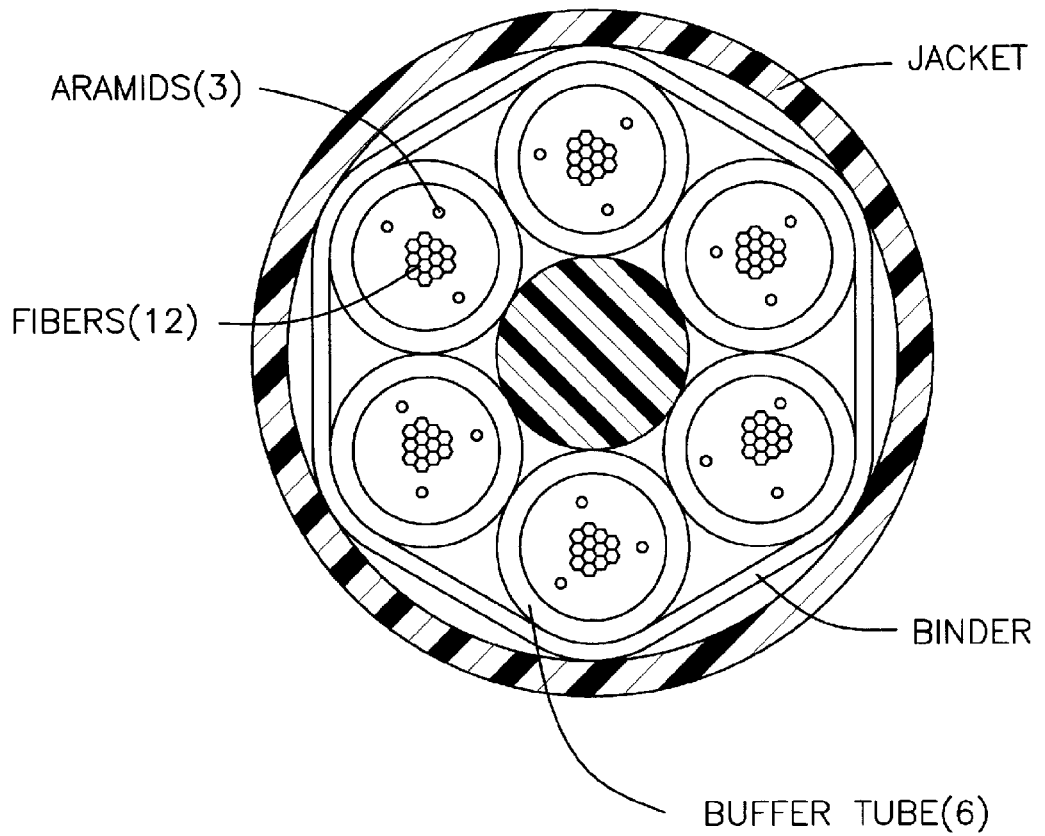

In tables 1-3 prior art contraction measurements are shown for the two prior art designs shown in FIGS. 1 and 2.

For example, Table 1 shows that the cold temperature contraction between 23° C. to 60° C. for the prior art arrangement from FIG. 1 is 0.22%.

TABLE 1

| 4 tube 1 grp PVDF jacket | ID (mm) | OD (mm) | Qty | Area | E (N/m) | a | AE | AEa | SUM AE | SUM Aea | a eff | Temp 23 to 60 | % contra |
|---|---|---|---|---|---|---|---|---|---|---|---|---|---|
| Tube (FRPVC) | 2 | 3 | 4 | 15.7 | 90 | 7E−05 | 1414 | 0.1 | | | | | |
| GRP | 0 | 1.3 | 1 | 1.3 | 50000 | 6E−06 | 66366 | 0.39 | | | | | |
| Jacket PVDF | 7.25 | 9.55 | 1 | 30.3 | 400 | 1E−04 | 12132 | 1.58 | | | | | |
| Plastic To GRP Ratio | | | | 34.7 | | | | | 79911.75 | 2.07 | 3E−05 | 83 | 0.22% |
| GRP flexible Bend Diameter (mm) = 100 × GRP Diameter | | 130 | | | | | | | | | | | |
| Typical Bend Cable Diameter is 20 X Cable OD | | 191 | | | | | | | | | | | |

Table 2 shows that the cold temperature contraction between 23° C. to 60° C. for the prior art arrangement from FIG. 2 is better but still 0.12%. Also the GRP needed is stiffer and has a flexible bend diameter that is very close to the cable bend diameter.

TABLE 2

| 6 tube 1 grp, Less Stiff Cable with large single GRP | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 6 | 23.6 | 90 | 7E−05 | 2121 | 0.15 | | | | | |
| GRP | 0 | 2.28 | 1 | 4.1 | 50000 | 6E−06 | 204141 | 1.21 | | | | | |
| Upjacket for grp | 2.28 | 3.2 | 1 | 4.0 | 90 | 7E−05 | 356 | 0.03 | | | | | |
| Jacket PVDF | 9 | 11.3 | 1 | 36.7 | 400 | 1E−04 | 14668 | 1.91 | | | | | |
| Plastic To GRP Ratio | | | | 14.8 | | | | | 221285.7 | 3.3 | 1E−05 | 83 | 0.12% |
| GRP flexible Bend Diameter (mm) = 100 × GRP Diameter | | 228 | | | | | | | | | | | |
| Typical Bend Cable Diameter is 20 X Cable OD | | 226 | | | | | | | | | | | |

Table 3 shows that the cold temperature contraction between 23° C. to 60° C. for the prior art arrangement from FIG. 2 is even better 0.09%, but this achieved by using a an even stiffer GRP. Although this may be helpful for preventing excessive low temperature contraction, the stiff GRP is too stiff and thus prevents the cable from being able to bend properly. For example, a typical GRP flexible bend diameter (mm)=100×GRP diameter. And, for a typical bend Cable diameter it is desirable to achieve 20×Cable OD (Outside Diameter). As shown by Table 3 the prior art design of FIG. 2 (using a very stiff GRP to achieve good cold temperature contraction results of 0.09%) is ultimately not effective because the large GRP used here only has a flexibility diameter of 320 mm which is to excessive to meet the desirable cable bend radius of approximately 226 mm (20×OD 11.3 mm).

In contrast, as shown in the following two tables 4-5, the present arrangement of FIG. 3 is able to achieve a better cold temperature shrinkage resistance while only using GRPs 18 that are sufficiently flexible for the desired bend radius of cable 10.

For example, table 4 shows that the cold temperature contraction between 23° C. to 60° C. for the arrangement of FIG. 3, with jacket 12 is made from PVDF and tubes 14 are made from FRPVC.

TABLE 3

| 6 tube 1 grp, Stiff Cable with large single GRP | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 6 | 23.6 | 90 | 7E−05 | 2121 | 0.15 | | | | | |
| GRP | 0 | 3.2 | 1 | 8.0 | 50000 | 6E−06 | 402124 | 2.39 | | | | | |
| Jacket PVDF | 9 | 11.3 | 1 | 36.7 | 400 | 1E−04 | 14668 | 1.91 | | | | | |
| Plastic To GRP Ratio | | | | 7.5 | | | | | 418912.5 | 4.45 | 1E−05 | 83 | 0.09% |
| GRP flexible Bend Diameter (mm) = 100 × GRP Diameter | | 320 | | | | | | | | | | | |
| Typical Bend Cable Diameter is 20 X Cable OD | | 226 | | | | | | | | | | | |

TABLE 4

| 3 tube 3 grp PVDF jacket | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Jacket PVDF | 6.45 | 8.75 | 1 | 27.5 | 400 | 1E−04 | 10983 | 1.43 | | | | | |
| Plastic To GRP Ratio | | | | 9.9 | | | | | 211141.7 | 2.69 | 1E−05 | 83 | 0.11% |
| GRP flexible Bend Diameter (mm) = 100 × GRP Diameter | | 130 | | | | | | | | | | | |
| Typical Bend Cable Diameter is 20 X Cable OD | | 175 | | | | | | | | | | | |

According to table 4, the present arrangement shows half of the cold temperature shrinkage (at −60° C.) relative to the most similar prior art of FIG. 1/Table 1, even with the same polymers used for the jackets and tubes.

Table 5 shows a second version of the present arrangement, also illustrated in FIG. 3 where both the tubes and jacket are made from FRPVC. As noted above, FRPVC has a lower coefficient of linear expansion contraction than PVDF and thus this version shows only ¼ of the contraction (at −60° C.), 0.06%.

modulus polymer to be used for jacket 12 while still meeting crush resistance requirements, such as the preferred FRPVC and which then approximately lowers the contraction from 0.22% to 0.06% instead of 0.11% (table 2 when the jacket 12 is PVDF).

Turning to the application of filler 22, in one embodiment, upon assembly of internal components tubes 14, GRPs 18 and binder 20 (assembly stranding and binding), prior to jacket 12 being applied by extrusion, the assembled internal components may be fed through a powder application solutions to

TABLE 5

| 3 tube 3 grp FRPVC jacket | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 3 | 11.8 | 90 | 7E−05 | 1060 | 0.08 | | | | | |
| GRP | 0 | 1.3 | 3 | 4.0 | 50000 | 6E−06 | 199098 | 1.18 | | | | | |
| Jacket FRPVC | 6.45 | 8.75 | 1 | 27.5 | 90 | 7E−05 | 2471 | 0.18 | | | | | |
| Plastic To GRP Ratio | | | | 9.9 | | | | | 202629.9 | 1.44 | 7E−06 | 83 | 0.06% |
| GRP flexible Bend Diameter (mm) = 100 × GRP Diameter | | 130 | | | | | | | | | | | |
| Typical Bend Cable Diameter is 20 X Cable OD | | 175 | | | | | | | | | | | |

Figure 4:
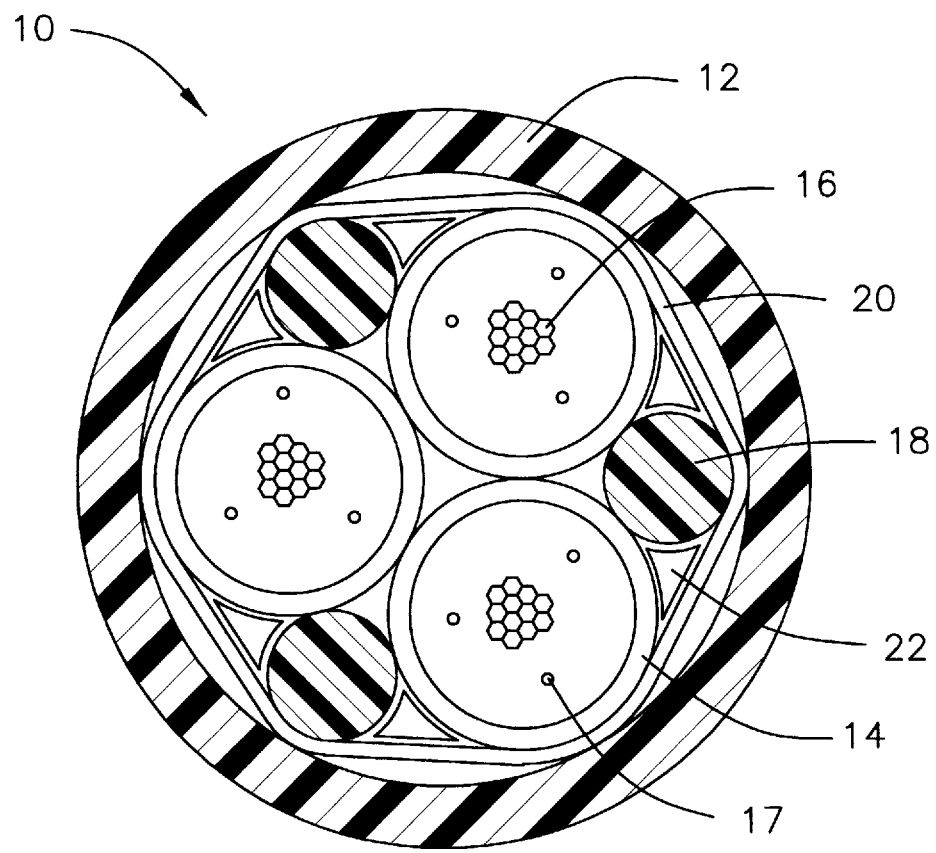
FIG. 4 is a cross section of a loose tube fiber optic cable according to one embodiment.

In another embodiment of the present arrangement as shown in FIG. 4, both tubes 14 and jacket 12 are made from FRPVC. This arrangement as noted above has a significant advantage over the prior art regarding ability to withstand cold temperature shrinkage while retaining end user flexibility. However, owing to the low modulus of the FRPVC of jacket 12, cable 10 has a poor ability to withstand crushing.

For example, in most fiber optic cable designs the majority of the components inside of the jacket are round and thus there are significant void/open spaces between the internal components. Such arrangements can normally only withstand 50N-100N per cm (of a 10 cm wide plate for a load of 500N-1000N).

According to the present arrangement, there is significantly less void space owing at least in part to the fact that there are more GRPs 18 per tube 16 within jacket 12. But, with the use of the FRPVC for jacket 12 (having a lower modulus) it is desirable to have additional crush resistance. As such, as shown in FIG. 4, the interstices between tubes 14 and GRPs 18 are filled with a filler powder/agent 22 to provide an improved ability to resist crushing. As a result, the cable 10 arrangement alone presents an improvement in crush resistance, e.g. from 120 N/cm-220 N/cm or greater for a 10 cm wide plate or substantially 1200N-2200N, with the additional filler 22 offsetting the reduction of strength of jacket 12 (by using FRPVC instead of PVDF).

According to this feature, filling the interstices with agent/filler 22 between tubes 14 and GRPs 18 allows for a lower fill between 25% to 75% of the remaining voids between binder 20 and tubes 14.

In one example filler 22 may be a flame retardant compound such as Alumina Trihydrate, (or magnesium hydroxide, or other hydrated mineral fillers powder). Here the Alumina Trihydrate powder is mixed with water to form a paste that is then applied to the stranded tubes 14 and GRPs 18, which in turn is run through a dryer or hot air channel. Likewise, if using a standard WS (water swellable) powder, the powder may be applied wet and dried in a similar manner. It is noted that a combination of the two types of powder may be used for filler 22. Additionally, one version may use the Alumina Trihydrate wet application and then, after drying a dry WS powder may be applied (for use as an actual water blocking agent).

Regardless of the powder used for filler 22, as a result of the above feature, internal components tubes 14, GRPs 18 and binder 20 along with filler 22 filling the interstices presents a substantially cylindrical arrangement within jacket 12 so that when compression is applied against jacket 12, there is a more uniform contact with the underlying components spreading the compression more evenly and thus reducing the likelihood that there is any attenuation in the fibers 16 within tubes 14.

It is noted that the above example employs filler 22 in combination with a jacket 12 made of FRPVC. However, if desired, filler 22 may be used in conjunction with the earlier described example that uses PVDF for a jacket 12. In such as case a compression of 152 N/cm (1520 N) or higher for the 10 cm wide plate can be achieved.

Moreover, filler 22 may have additional advantages beyond the crush resistant properties discussed above. For example, the use of Alumina Trihydrate as filler 22, added to the interstices between tubes 14 and GRPs 18 will advantageously add significant fire resistant properties to cable 10. For example, although Alumina Trihydrate which forms water upon combustion is known as one possible additive to use in PVC to form FRPVC, it has significant drawbacks regarding the degradation of the PVC as an insulator (it can cause it to crack if added in large quantities). However, in the present arrangement, by using it as a paste/filler 22 outside of the polymer itself but inside jacket 12, if such paste/filler 22 were to crack, it would not have the same impact as it would if the Aluminum Trihydrate were incorporated directly into tubes 14 and jacket 12. As such, filler 22 may not only be used in the present described cables 10 as shown in FIG. 4, but also in other loose tube and even tight buffer fiber optic cable designs for both crush resistance and additional fire resistance.

It is also noted that the above described arrangement in FIGS. 3 and 4 show arrangements with three (3) tubes 14 and three (3) GRPs 18. However, as shown in FIGS. 5 and 6 additional smaller versions of cable 10 may employ the same features as described above for twenty four (24) fiber (FIG. 5) and twelve (12) fiber (FIG. 6) arrangements, with similar advantages provided with respect to shrinkage resistance at very cold temperatures (−60° C.) and crush resistance.

Figure 5:
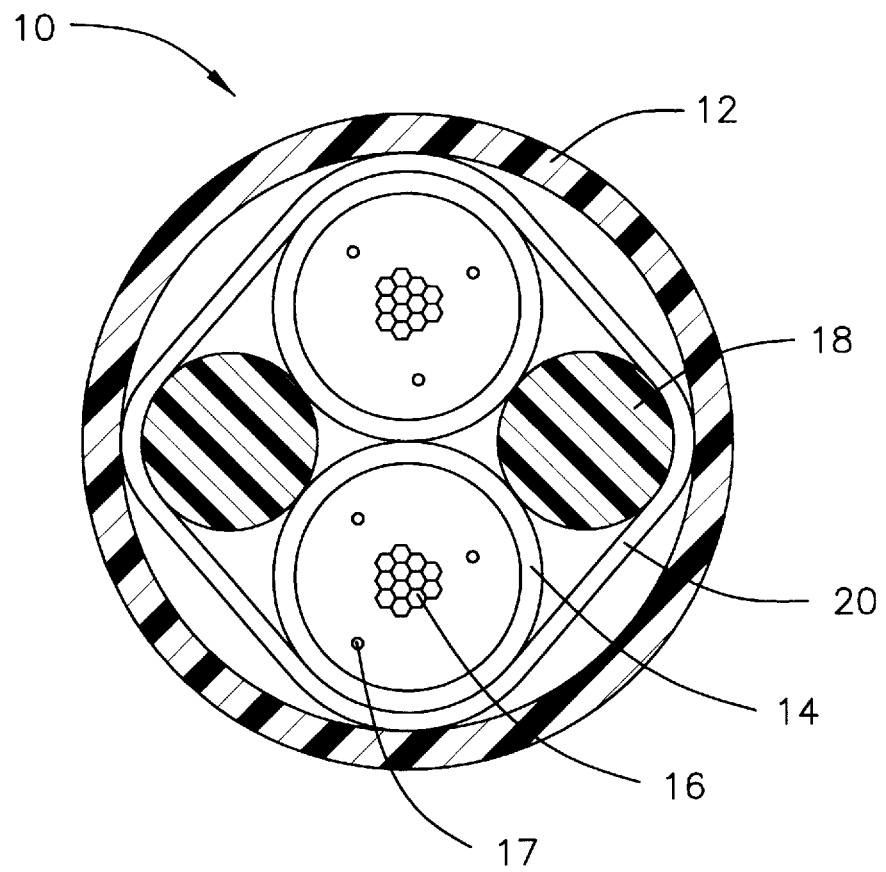
FIG. 5 is a cross section of a loose tube fiber optic cable according to another embodiment.
Figure 6:
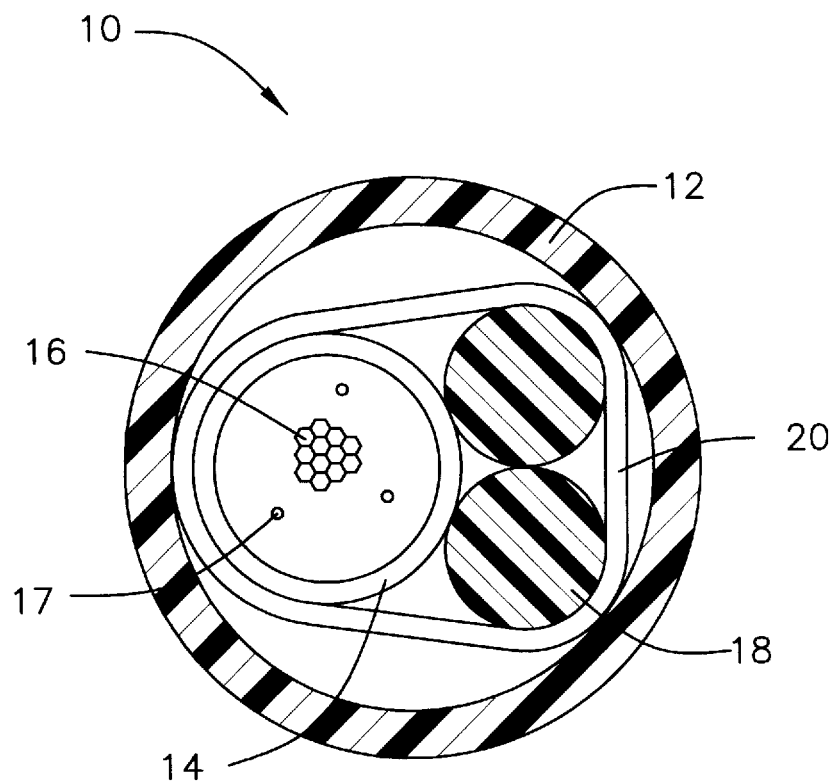
FIG. 6 is a cross section of a loose tube fiber optic cable according to one embodiment.

The following tables 6 and 7 and relating to FIGS. 5 and 6 respectively both show that these designs for cable 10 have only a 0.06% cold temperature shrinkage between 23° C. to 60° C. while using GRPs 18 that are sufficiently flexible to maintain the desired bend radius for cable 10.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic cable, said cable comprising:
a plurality of buffer tubes each with one or more optical fibers, said buffer tubes having a first coefficient of contraction;
a plurality of strength members, said strength members having a second coefficient of contraction and a flexibility diameter equivalent of said strength members is less than a desired cable bend diameter; and
a jacket, said jacket having a third coefficient of contraction,
wherein the cross-sectional area of said strength members is increased relative to the cross-sectional area of said buffer tubes and jacket, so that a ratio of cross sectional area of said buffer tubes and jacket to said strength member is less than 14.8, so as to obtain an overall combined coefficient of contraction of the assembly of cable components which contributes to improve cold temperature resistance, so that the combined structure of said buffer tubes, said jacket and said strength members is such that said fibers within said buffer tubes meet maximum attenuation of substantially 0.07 db increase at −60° C.

2. The fiber optic cable of claim 1, wherein the components of said buffer tubes and said strength members are SZ stranded.

3. The fiber optic cable of claim 2, further comprising a binder around said strength members and said buffer tubes.

4. The fiber optic cable of claim 3, wherein said buffer tubes and said strength members are stranded at a lay length of a substantially 3-4 inches.

TABLE 6

| 2 tube 2 grp FRPVC jacket | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 2 | 7.9 | 90 | 7E−05 | 707 | 0.05 | | | | | |
| GRP | 0 | 1.3 | 2 | 2.7 | 50000 | 6E−06 | 132732 | 0.79 | | | | | |
| Jacket FRPVC | 6 | 8.3 | 1 | 25.8 | 90 | 7E−05 | 2325 | 0.17 | | | | | |
| Plastic To GRP Ratio | | | | 12.7 | | | | | 135764 | 1.01 | 7E−06 | 83 | 0.06% |
| GRP flexible Bend Diameter (mm) = 100 × GRP Diameter | | 130 | | | | | | | | | | | |
| Typical Bend Cable Diameter is 20 X Cable OD | | 166 | | | | | | | | | | | |

TABLE 7

| 1 tube 2 grp FRPVC jacket | ID (mm) | OD (mm) | Qty | Area | E (N/mm^2) | a | AE | AEa | SUM AE | SUM Aea | a eff | Temp 23 to 60 | % contraction |
|---|---|---|---|---|---|---|---|---|---|---|---|---|---|
| Tube (FRPVC) | 2 | 3 | 1 | 3.9 | 90 | 7E−05 | 353 | 0.03 | | | | | |
| GRP | 0 | 1.3 | 2 | 2.7 | 50000 | 6E−06 | 132732 | 0.79 | | | | | |
| Jacket FRPVC | 4.3 | 6.6 | 1 | 19.7 | 90 | 7E−05 | 1772 | 0.13 | | | | | |
| Plastic To GRP Ratio | | | | 8.9 | | | | | 134857.8 | 0.94 | 7E−06 | 83 | 0.06% |
| GRP flexible Bend Diameter (mm) = 100 × GRP Diameter | | 130 | | | | | | | | | | | |
| Typical Bend Cable Diameter is 20 X Cable OD | | 132 | | | | | | | | | | | |

5. The fiber optic cable of claim 4, wherein said binder is applied over said buffer tubes and strength members in a uni-directional helical lay of substantially 0.8 inches.

6. The fiber optic cable of claim 1, wherein said buffer tubes further comprising aramid strength members.

7. The fiber optic cable of claim 1, wherein said optical fibers are UV coated optical fibers.

8. The fiber optic cable of claim 1, wherein said buffer tubes are made from FRPVC (Flame Resistant Polyvinyl Chloride).

9. The fiber optic cable of claim 1, wherein said jacket is made from FRPVC (Flame Resistant Polyvinyl Chloride).

10. The fiber optic cable of claim 1, wherein said jacket is made from PVDF (Polyvinylidene Fluoride).

11. The fiber optic cable of claim 1, wherein said strength members are GRPs (Glass Reinforced Polymers).

12. The fiber optic cable of claim 1, wherein there are three buffer tubes and three strength members.

13. The fiber optic cable of claim 12, wherein said three buffer tubes are centered within said jacket and wherein said three strength members are positioned on the periphery nearer to said jacket.

14. The fiber optic cable of claim 1, wherein there are two buffer tubes and two strength members.

15. The fiber optic cable of claim 14, wherein said two buffer tubes are centered within said jacket and wherein said two strength members are positioned on the periphery nearer to said jacket.

16. The fiber optic cable of claim 1, wherein there is one buffer tubes and two strength members.

17. The fiber optic cable of claim 16, wherein said one buffer tube and said two strength members are all positioned on the periphery nearer to said jacket rather than any one component being centered.

18. The fiber optic cable of claim 1, further comprising a filler within said jacket, configured to fill interstices between said buffer tubes and said strength members.

19. The fiber optic cable of claim 18, wherein said filler tills in between 25% to 75% of said interstices.

20. The fiber optic cable of claim 18, wherein said filler is selected from the group consisting of alumina trihydrate, magnesium hydroxide, hydrated mineral fillers and water swellable powder.

21. The fiber optic cable of claim 18, wherein said cable is crush resistant to a force greater than 100N/cm.

22. The fiber optic cable of claim 18, wherein a flexibility diameter equivalent of said strength members is less than a desired cable bend diameter and is in plastic to strength member ratio in the range of 9.9 to 12.7 and wherein said contraction of said cable in a transition from −23° C. to −60° C. is less than 0.06%.

23. A fiber optic cable, said cable comprising:
   at least one buffer tube with one or more optical fibers;
   at least one strength member; and
   a jacket extruded onto said at least one buffer tube and said at least one strength members,
   wherein the arrangement of said at least one buffer tube and said at least one strength member within said jacket leaves void spaces in the interstices between said buffer tube and said strength members, and wherein such interstices are filled with a powder filler substance before the application of said jacket, such powder filler providing uniform contact between said at least one buffer tube and said at least one strength member to provide improved crush resistance by spreading compression evenly within said jacket.

24. The cable as claimed in claim 23 wherein said powder filler is Aluminum Tryhydrate.

* * * * *

UNITED STATES PATENT AND TRADEMARK OFFICE
CERTIFICATE OF CORRECTION

PATENT NO.         : 8,639,076 B2
APPLICATION NO.    : 12/858153
DATED              : January 28, 2014
INVENTOR(S)        : Keller et al.

It is certified that error appears in the above-identified patent and that said Letters Patent is hereby corrected as shown below:

In the Claims

Column 10, Claim 4, Line 36: the term --SZ-- should be inserted between the words "are" and "stranded".

Column 12, Claim 19, Line 4: The word "tills" between the words "filler" and "in" should read "fills".

Signed and Sealed this
Twenty-ninth Day of April, 2014

Michelle K. Lee
*Deputy Director of the United States Patent and Trademark Office*